Figure 1:
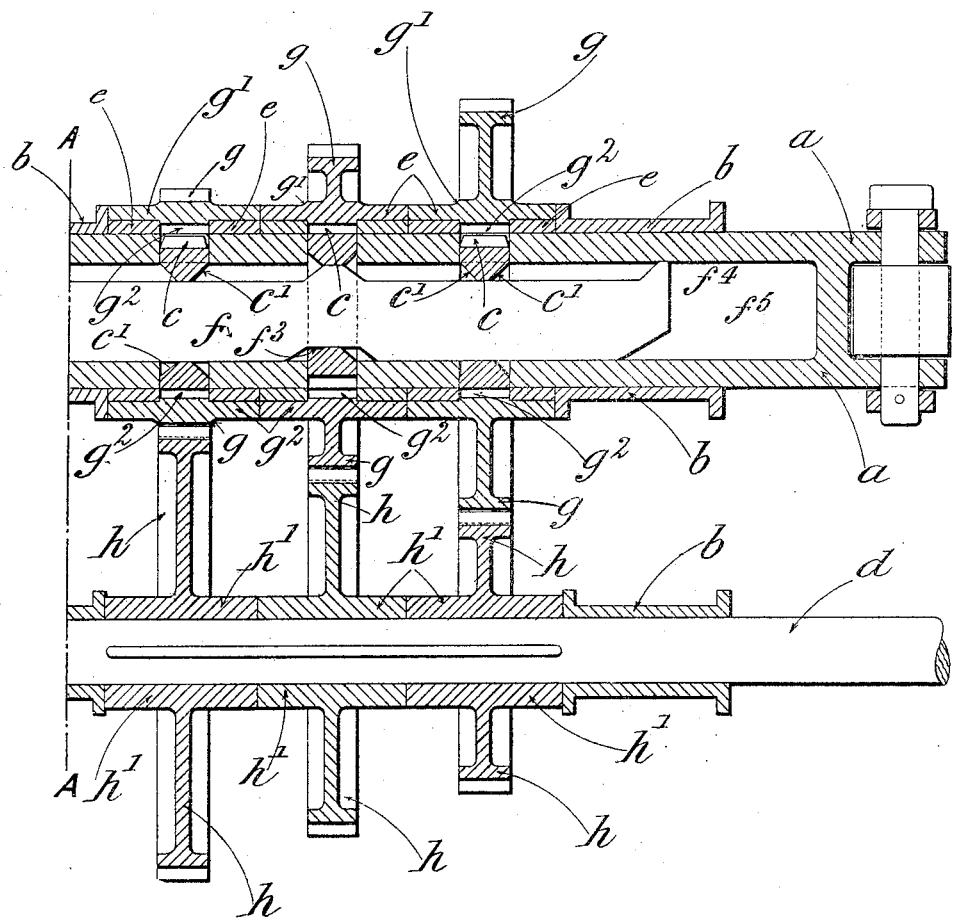

No. 798,219. PATENTED AUG. 29, 1905.
W. H. SCOTTON.
CLUTCH MECHANISM.
APPLICATION FILED JAN. 3, 1905.

2 SHEETS—SHEET 1.

WITNESSES.
Wm Munn Andrew
Henry J. Brockwell

INVENTOR.
William Henry Scotton,
by Fairfax & Wetter,
Attorneys.

No. 798,219.　　　　　　　　　　　　　　　PATENTED AUG. 29, 1905.
W. H. SCOTTON.
CLUTCH MECHANISM.
APPLICATION FILED JAN. 3, 1905.
2 SHEETS—SHEET 2.
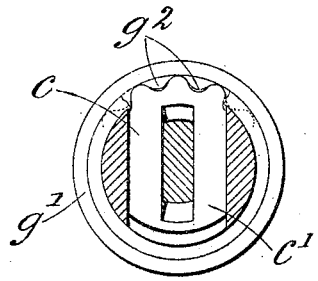
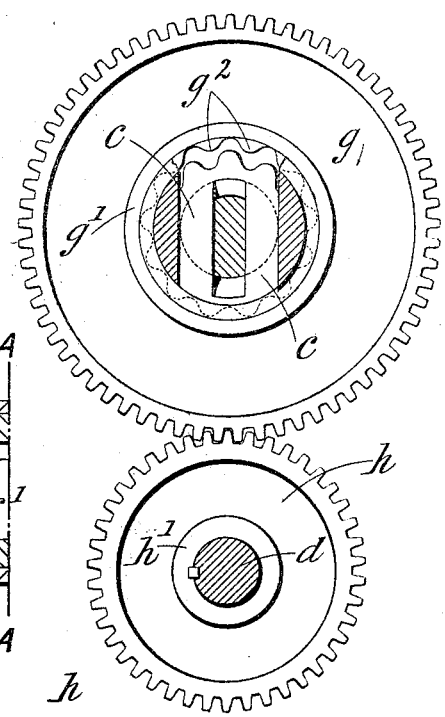
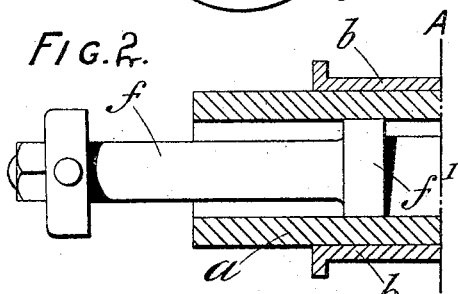
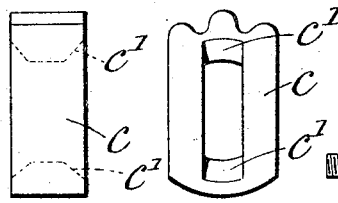
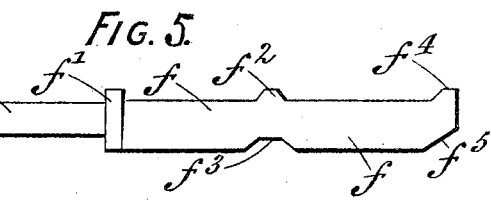
WITNESSES.　　　　　　　　　　　　　　INVENTOR.

UNITED STATES PATENT OFFICE.

WILLIAM HENRY SCOTTON, OF IPSWICH, ENGLAND, ASSIGNOR OF ONE-HALF TO ARTHUR HACKBLOCK, OF FERN BEECH, EPSOM, ENGLAND.

CLUTCH MECHANISM.

No. 798,219.          Specification of Letters Patent.          Patented Aug. 29, 1905.

Application filed January 3, 1905. Serial No. 239,388.

*To all whom it may concern:*

Be it known that I, WILLIAM HENRY SCOTTON, a subject of the King of the British Dominions, residing at Ipswich, in the county of Suffolk, England, (whose post-office address is 69 All Saint's road, Ipswich,) have invented certain new and useful Improvements in Clutch Mechanism, of which the following is a specification.

This invention relates to improvements in the mechanism used for clutching a required member of a series of spur-wheels which are mounted on a hollow shaft, the said wheels intermeshing with corresponding spur-wheels mounted on a second shaft parallel with the first.

In the further description of this invention reference is made to the accompanying drawings, in which—

Figure 1 is a sectional elevation of the said two shafts with the intermeshed wheels thereon. Fig. 2 is a sectional extension of part of the hollow shaft on the left side of Fig. 1. Fig. 3 is a sectional transverse elevation of two of the intermeshed wheels with the clutching device out of action. Fig. 4 is a transverse section of the hollow shaft with the clutch device in action. Fig. 5 is a longitudinal elevation of a sliding bar operating the clutch device. Fig. 6 is a front elevation of the clutch device, and Fig. 7 a transverse elevation of the same.

In the drawings a hollow shaft $a$ is revolubly mounted in bearings $b$, and three or other plural number of spur toothed wheels $g$ are loosely mounted on the hollow shaft $a$, so that they may revolve freely thereon. A sliding driver or locking-piece $c$, of special construction, movable within a slot cut through the hollow shaft $a$ beneath each wheel mounted thereon, is adapted to lock each of the said toothed wheels to the shaft, according to the will and action of the operator in sliding the said key into position to lock the desired wheel, by means of a sliding bar. Another but solid shaft $d$ is also mounted in suitable bearings $b$, arranged parallel with the hollow shaft $a$ when the invention is used, for example, for speed-changing gearing. The wheels on the hollow shaft vary in diameter and are mounted loosely until locked and kept from moving sidewise by sleeves, collars, distance-pieces $e$, or the like, so as to be exactly opposite the wheels $h$ of a corresponding diameter, which are keyed to the solid shaft. The hollow shaft is bored to receive a sliding bar $f$, having a collar $f'$ near the end, by which it is actuated, the said collar being slightly smaller than the bore of the shaft to enable it to slide within freely as far as may be required. From the collar to the other end the sliding bar is flattened and portions cut away at obtuse angles, so that at about the center a short parallel piece $f^2$ of the bar is left projecting at the full diameter and in line with the surface of the collar, beveled obtusely down on each side to the cut-away portions of the bar, while a corresponding recess $f^3$ is cut away from the opposite or full line of the bar; but the recess is rather wider and with more obtuse angles than the projecting piece. At the extreme end of the flattened part of the bar a similar parallel projection $f^4$ is left standing, but beveled on one side only, and a wide and flatter bevel $f^5$ made at the opposite edge to approximately correspond to the projection; but in some cases this may be modified.

Each wheel $g$ on the hollow shaft $a$ is formed or combined with a bored flange $g'$ and has internal teeth $g^2$ formed within the bore of its hub the teeth being preferably of the rounded type top and bottom. A slot is cut through the hollow shaft where each wheel $g$ is mounted, and a sliding key $c$, acting as a driver, is fitted to slide up and down in each of these slots, having on one edge a few teeth similarly formed to the internal teeth and adapted to engage with them. This sliding driver $c$ is shown separately in the two elevations, Figs. 6 and 7. An oblong slot, with beveled edges $c'$ at the top and bottom, is also formed in each sliding driver, and the driver is adapted to freely slide on the flattened part of the sliding bar $f$, so that when confined in place within its slot in the hollow shaft and the sliding bar pushed in and out by any suitable means the projecting portion $f^2$ of the sliding bar coming in contact with the beveled edges $c'$ forces the sliding driver $c$ up through its slot on one side of the hollow shaft, causing the few teeth of that particular driver to engage with the internal teeth $g^2$ of the corresponding wheel, as shown in Figs. 1 and 4, and therefore locking it to the shaft to partake of its circular motion.

In pushing the sliding bar $f$ into position to lock a particular wheel to the hollow shaft $a$ and forcing its special driver $c$ up to engage with its wheel $g$ by means of the short parallel piece $f^2$ left projecting on that edge of the bar, as just described, the remaining cut-away portion or portions, together with the full diameter of its opposite edge, are adapted to withdraw any other driver $c$ that may have been locked by its teeth to its corresponding wheel, so that the latter becomes free. Therefore however many pairs of wheels may be intermeshed only one pair can be so connected at one time as to fully transmit all the driving power, the others being out of engagement through their respective driving-keys $c$ being depressed on the side of the cut-away part of the bar $f$; but the above-mentioned and projecting piece may also be used to force the end driver into engagement with its wheel, thus shortening the travel of the sliding bar; otherwise one projection, situated about the center of the length of the flattened part, is sufficient for that purpose; but if the said projecting parts are used they must be so spaced with relation to the portion of the wheels on the hollow shaft that only one of the latter can be locked to its shaft at a time, all other wheels that may be employed being loose or free to turn on the hollow shaft. The end projecting piece is also adapted as a guide within the hollow shaft at one end and the collar above mentioned as another.

In order to keep the wheels $g$ a sufficient distance apart and to allow for the cutting of the internal teeth $g^2$, they are provided with flanges $e$, bored below the depth of and seated upon thimbles which may be loose on the shaft.

What I claim, and desire to secure by United States Patent, is—

In a clutch mechanism the combination of a hollow shaft having a plurality of slots therein, with a toothed wheel having internal teeth in its bore and an extended hub mounted revolubly at each slot, said hub being bored to allow said internal teeth to be cut full depth, a key-driver having projecting teeth on one part of its peripheral surface, plain circular surface on the opposite peripheral surface, parallel sides and a central oblong slot, a bar flat at a portion of its length having a projecting part and corresponding recess on opposite edges adapted to slide within said key-driver slot and said hollow shaft to force said driver-teeth into or out of contact with said internal teeth, substantially as and for the purpose specified.

In testimony whereof I have signed this specification in the presence of two subscribing witnesses.

WILLIAM HENRY SCOTTON.

Witnesses:
JAMES HOWARD HORNER,
HENRY J. BROCKWELL.